Oct. 29, 1968  N. S. KAPANY  3,408,131
APPARATUS FOR COUPLING AND AMPLIFYING
LIGHT BETWEEN OPTICAL FIBERS
Filed Nov. 13, 1963  3 Sheets-Sheet 1

INVENTOR.
NARINDER S. KAPANY
BY
Townsend and Townsend
ATTORNEYS

INVENTOR.
NARINDER S. KAPANY
BY
*Townsend and Townsend*
ATTORNEYS

Oct. 29, 1968
N. S. KAPANY
3,408,131
APPARATUS FOR COUPLING AND AMPLIFYING
LIGHT BETWEEN OPTICAL FIBERS
Filed Nov. 13, 1963
3 Sheets-Sheet 3
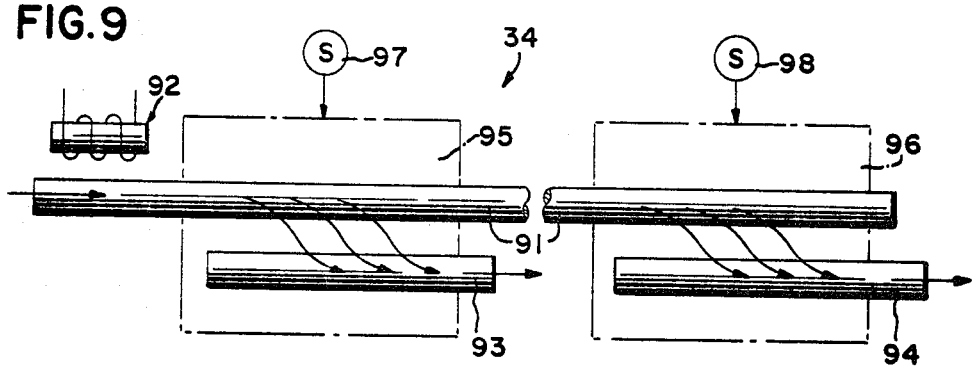
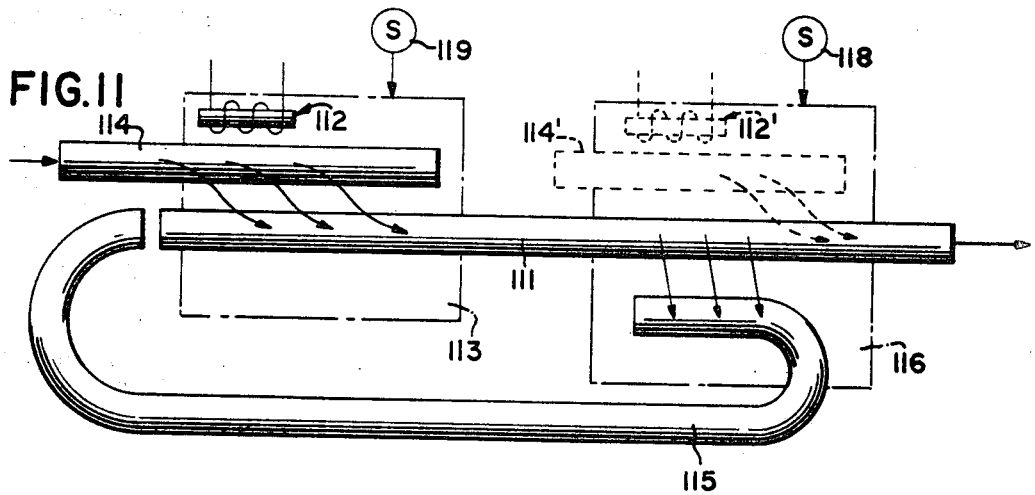
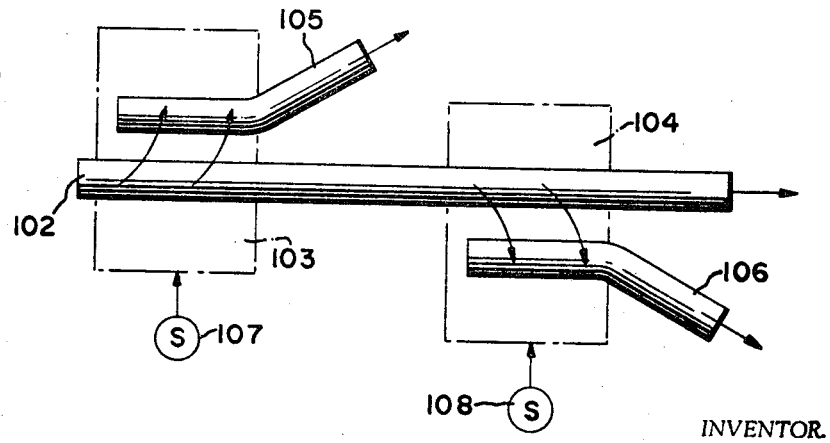
INVENTOR.
NARINDER S. KAPANY
BY
Townsend & Townsend
ATTORNEYS

3,408,131
APPARATUS FOR COUPLING AND AMPLIFYING LIGHT BETWEEN OPTICAL FIBERS
Narinder S. Kapany, Woodside, Calif., assignor to Optics Technology, Inc., Belmont, Calif.
Filed Nov. 13, 1963, Ser. No. 323,446
7 Claims. (Cl. 350—96)

ABSTRACT OF THE DISCLOSURE

An apparatus for coupling and amplifying light between optical fibers to produce a switching function for providing various forms of logic circuits. A light-transmitting medium, enveloping adjacent pairs of optical fibers, and having an index of refraction that can be varied as desired to produce coupling of light between the adjacent fibers.

---

This invention relates to a method of and apparatus for establishing switching functions for the accomplishment of logic circuits using the medium of optical energy. This invention relates specifically to an optical gate in which optical energy can be transferred from one optical waveguide to another selectively by changing the optical coupling between adjacent waveguides.

One particularly effective means for accomplishing this coupling change in the case of two weakly coupled optical waveguides is the application of a control signal to change the effective beat length between the two waveguides so as to produce either an output or no output in one waveguide. Another effective means is the application of a control signal which produces a change in the ratio of the indices of refraction of the waveguides and their surrounding medium to strongly couple the waveguides initially only weakly coupled so as to produce an output from one of the waveguides from which there was substantially no output before application of the signal.

In establishing logic gates it is necessary to provide between elements a switching function under the control of a control signal. With this switching function between elements various forms of logic circuits, such as ANDs, ORs, NORs, etc., can be formulated. Many devices have been utilized in the past to accomplish this switching function, such as relays, vacuum tubes, diodes, transistors, chemical agents and the like.

The essence of this invention is the provision of a new type of logic gate employing a signal of light which can be switched through a matrix of simple or complex gates to accomplish the functions which have been conventionally used in the past in electrical logic circuits.

The further object of this invention is to provide within such an optical switching arrangement the application of light amplifications in conjunction or in addition to the light coupling control between selective switching fibers or waveguides, so that the switched circuits can be reinforced at the instant of switching or subsequently to provide output signals of a practical intensity.

One of the principal advantages of this invention lies in the fact that the interrelated optics can be formed of thin fibers formed of glass, quartz, plastic or other light-carrying materials which can be nested in bundles and configurations so as to allow for extremely complex switching arrangements within very small space requirements, as small as anything presently envisioned.

Another feature and advantage of this invention lies in the fact that the transmitting fibers can be void of electrical intercommunication so that the transmitting signal is in the form of light while the control signal may well be in another form of energy, such as electrical, magnetic or elastic so that circuit isolation between the control signal and the output signals can be obtained, thus allowing circuit configurations normally plagued with back circuits to be constructed with a high degree of isolation.

Another feature and advantage of this invention lies in the fact that the transmitted signal through the optical fibers travels at the speed of light so that the ultimate speed of the device is controlled only by the limitation of the type of coupling control. With optimum design and construction, such switching can be obtained at extreme speeds.

Another feature and advantage of this invention lies in the fact that the optical transference or switching is confined to optical energy of preselected frequencies which can be controlled by other than electromagnetic or electrical parameter controls, so that a computing or gate structure can be constructed which would be resistant to interference from radiation or ambient electromagnetic conditions, such as might be caused by the effect of release of atomic energy or atmospheric conditions caused by such phenomena.

Another object of this invention is to provide an optical gate which can controllably couple light between light transmitting elements by the variation of a control condition and amplify the light within the coupled circuits to provide an output light of usable intensity.

Another object of this invention is in the provision of apparatus for transferring light from one fiber to an adjacent fiber or waveguide in a phase relationship with the light traveling alternatively from one fiber to the other along their adjoining lengths wherein control of the light at any point within each fiber or waveguide can be obtained by varying the phase angle or velocity of the light by subjecting the fibers to external or ambient forces such as magnetic, electrostatic or electromagnetic.

Other objects, features and advantages of the present invention will become apparent upon reading the following specification and referring to the accompanying drawing in which similar characters of reference represent corresponding parts in each of the several views.

Figure 4A:
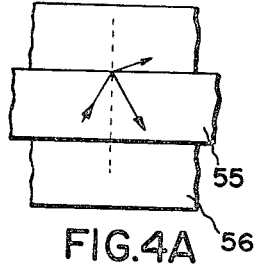
Figure 4B:
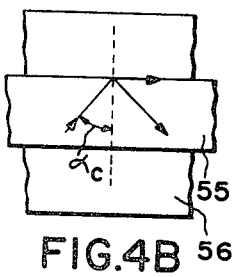
Figure 4C:
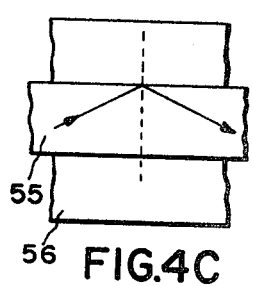
Figure 6:
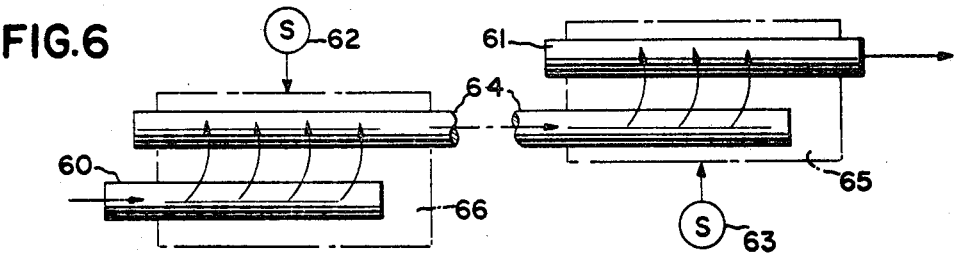
Figure 7:
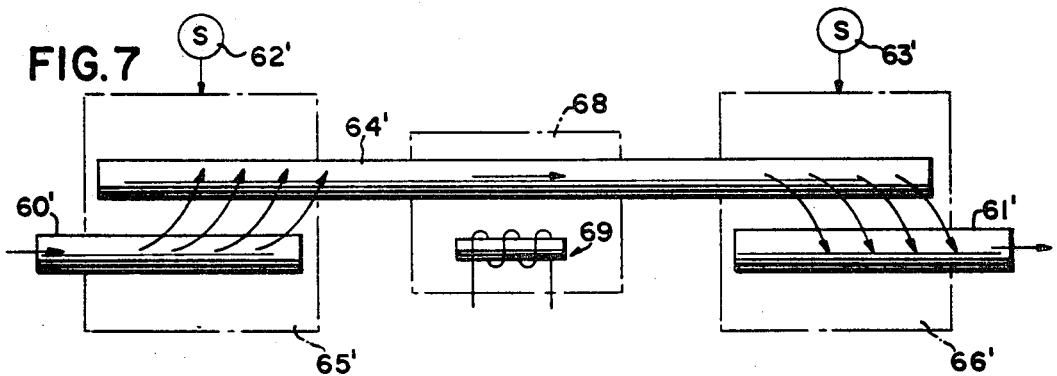
Figure 8:
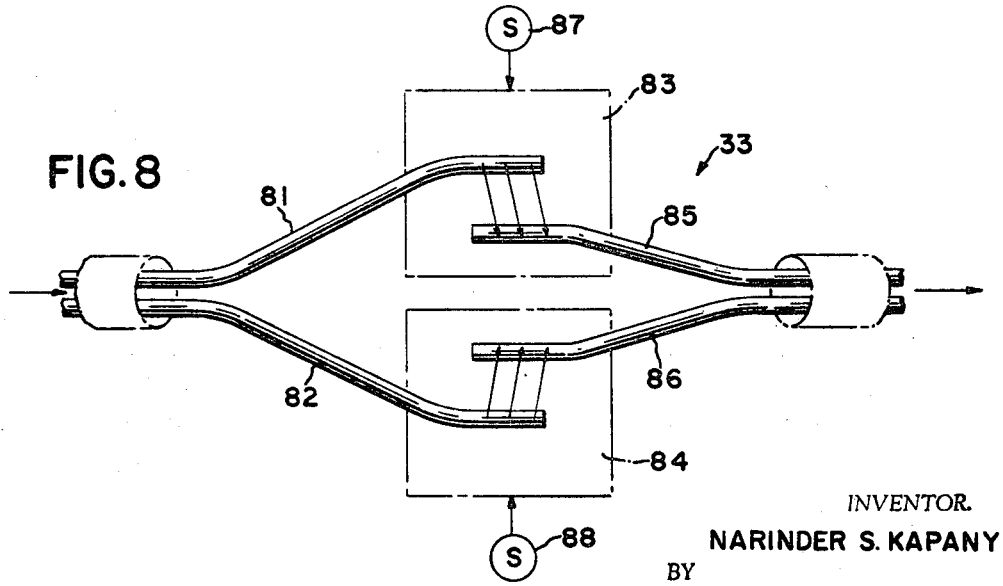

FIGS. 4A–C are schematic views showing an optical fiber embedded in a surrounding medium and illustrating in geometrical optics the propagation of a light ray under different conditions;

FIGS. 5A–D are schematic views showing a pair of optical fibers embedded in a surrounding medium and illustrating propagating characteristics in the evanescent boundary of the fibers in accordance with dielectric waveguide theory;

FIG. 6 is a schematic view of an AND gate utilizing light coupling between optical fibers;

FIG. 7 is a schematic view of an AND gate similar to that of FIG. 6 utilizing a lasing fiber;

FIG. 8 is a schematic view of an OR gate utilizing optical fibers;

FIG. 9 is a schematic view of an OR gate utilizing a lasing fiber;

FIG. 10 is a schematic view of a NOR gate utilizing features of the present invention; and FIG. 11 is a schematic view of a feedback circuit utilizing features of the present invention.

Figure 1:
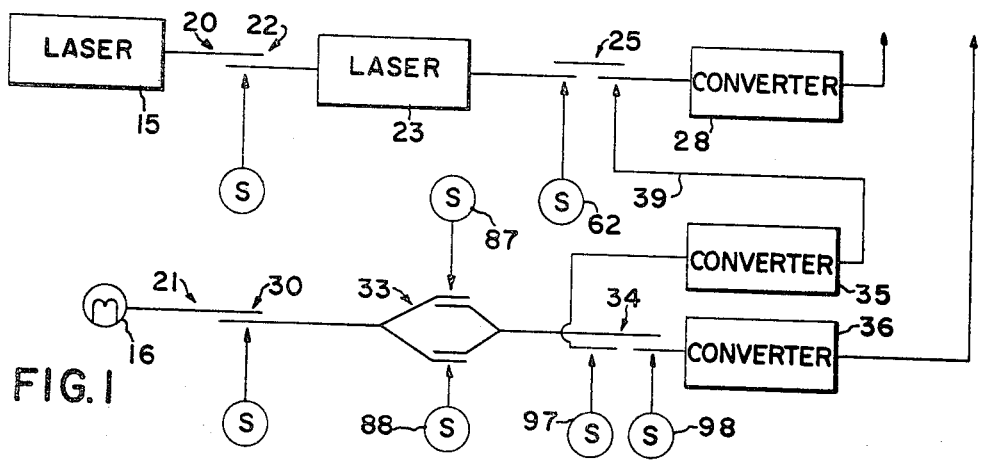
FIG. 1 is a schematic view of a portion of a computer circuit using the various gate and logic embodiments of this invention.

Referring now to the drawings, and as can be particularly seen in FIG. 1, this invention provides a series of optical elements which can be interconnected to form computer logic, in which the various functions of complex logic can be combined by the interconnection of the various component elements constituting this invention.

In FIG. 1 elements constituting this invention are combined to illustrate a computer type of interconnection and intercooperation in which the initial output from either a laser light source 15 or a conventional narrow band light source 16 provides light for an optical logic train 20 of an optical logic train 21, respectively. The logic train 20 comprises an optical gate 22 the output of which is amplified by a laser 23 and thence transmitted to an AND gate 25. The AND gate output is applied to a converter 28 which converts the optical signal to another form of energy such as electrical, mechanical or magnetic. In train 21 an optical gate 30 is provided to transmit its output to a OR gate 33, the output of which is transmitted to a laser controlled AND-OR gate 34 in which the laser functions to amplify and switch to either converter 35 and/or converter 36. The two converters 35 and 36 can be of the same types as converter 28. As can be seen, the output of converter 35 can be of a type of energy which will effectuate the control of AND gate 25 as seen by interlinking line 39.

Figure 2:
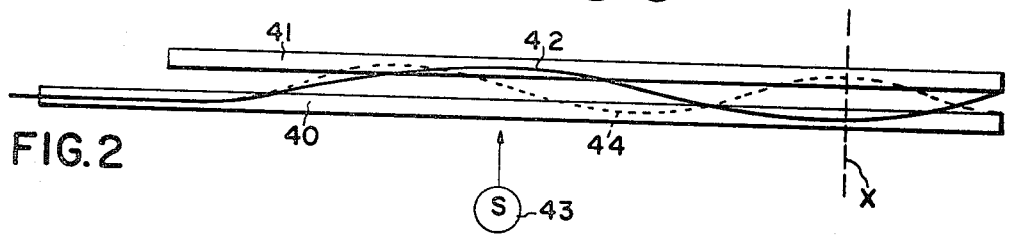
FIG. 2 is a schematic view of a pair of optical waveguides illustrating light coupling between the waveguides under two different physical conditions.

Referring now to FIG. 2, there is shown a schematic illustration of the optical gate 22 showing the manner in which the coupling between two weakly coupled optical waveguides 40 and 41 contained in a medium (not shown) is changed by effectively changing the length of the waveguide in which light is coupled from one waveguide to the other. The two waveguides are typically optical fibers adapted to propagate light of a substantially fixed frequency in a single mode and are arranged substantially parallel. Under a given set of physical conditions light of the fixed frequency introduced into the end of one of the two waveguides is coupled into the other waveguide and then back into the first waveguide as it travels the length of the waveguides so that for a given position along the length of the two waveguides the light is either distributed between the waveguides or is substantially all in one or the other of the waveguides. In the figure, a solid line 42 having a substantially sinusoidal configuration indicates the relative position along the length of the waveguides of the light energy introduced into the first waveguide 40. As shown, the light is initially substantially entirely in the waveguide 40, then partially distributed between the waveguides 40 and 41, then substantially entirely in waveguide 41, then again partially distributed between the waveguides 40 and 41 and then at a point X further on down the waveguides, substantially entirely back in waveguide 40. Thus, the light beats back and forth between waveguides.

If the physical condition of the waveguides 40 and 41 is changed, such as by the application of a signal 43 of one of the types described below such as, for example, electric and/or magnetic fields which produce a Kerr or Faraday effect, the phase velocity of light in the waveguides 40 and 41 is changed so that the coupling between guides is changed, and the distribution of the light coupled between the waveguides 40 and 41 is rearranged and may take the configuration of the dotted line 44. Depending upon the change in velocity, at some point X along the waveguides, whether it be after one cycle of coupling between waveguides or a number of cycles, the light energy distribution will have changed from a condition of being substantially entirely in the first waveguide 40 to a condition of being substantially entirely in the second waveguide 41. Thus, it can be seen that the application of the signal 43 serves the function of switching the light at position X from the first waveguide 40 to the second waveguide 41. In a typical gate in accordance with the present invention the first fiber 40 is terminated at the point X so that in absence of the signal 43 there is no light output from fiber 41 but in the presence of signal 43 there is a light output from fiber 41 which will not couple back into fiber 40.

Figure 3:
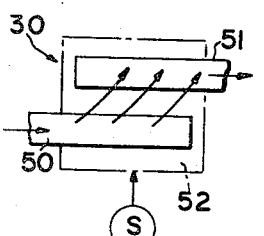
FIG. 3 is a schematic view showing a pair of optical fibers embedded in a surrounding medium and illustrating light coupling between the fibers in accordance with certain aspects of the present invention.

Referring now to FIG. 3, gate 30 includes a pair of optical fibers 50 and 51 of a passive material such as, for example, barium crown glass embedded in a surrounding light-transmitting medium 52 such as, for example, a barium crown glass which has an index of refraction lower than that of fibers 50 and 51.

The geometry of the fibers including the diameter, the cross-section, and the separation as well as the composition of the fibers and the surrounding medium are selected to cause light in a narrow frequency range introduced into fiber 50 to have a first characteristic of penetration beyond the physical boundaries of the fiber 50 when subjected to a first physical condition and a second characteristic of penetration beyond the physical boundaries of the fiber 50 when subjected to a second physical condition, whereby a substantial amount of the light from fiber 50 is coupled into the fiber 51 under the second physical condition and not under the first. In the present illustrative embodiment the difference between the first physical condition and the second physical condition which changes the coupling characteristics between the fibers 50 and 51 is the application of a signal such as, for example, a high strength magnetic field which changes the ratio of the indices of refraction of the fiber material and the surrounding medium.

Obviously, instead of the introduction of such a magnetic field to change the characteristic of penetration, under the proper conditions this change may be made by the interruption of such a field applied to the respective fibers and surrounding media. Other changes in the physical conditions to effect a change in the coupling characteristics are described in greater detail below in describing the phenomenon which takes place during coupling.

Optical fibers of the type referred to herein and which serve as waveguides for light are typically made of optical glass or other transparent material having a relatively high index of refraction and which are surrounded with a coating having a low refractive index. Optical fibers of this general nature and which are typically "passive" are described generally in the article by Narinder S. Kapany, entitled "Fiber Optics," in the November 1960 issue of "Scientific American" at pages 72–81. "Active" fibers having substantially the same light transmitting characteristics as passive fibers and which can themselves amplify light by stimulated emission radiation can be produced by doping optical glass with an active material. Such active fibers are hereinafter called "lasing fibers" since the fibers serve as the active elements of a laser.

Reference is now made to FIGS. 4 and 5 for an explanation of the coupling phenomenon utilized in the present invention. In accordance with geometrical optical principles, when light traveling in a first medium, such as in a fiber 55, shown in FIG. 4A, falls obliquely on the dividing surface or interface with a second medium, such as the surrounding medium 56 at a small angle with the normal to the interface, part of the light is invariably reflected back through the first medium while another part passes into the second medium, the rays being bent or refracted at the interface. The amount of refraction depends on the difference between the speed of light in the two media and the direction in which the ray is bent depends upon whether the speed is greater in the first or second medium. When the ray travels from a medium of lower velocity (higher index of refraction) to a medium of a higher velocity (lower index of refraction) it bends away from the normal to the interface as shown in FIG. 4A. As the angle between the incident ray and the normal to the interface within the first medium is increased to what is called the "critical angle" designated $\alpha_c$ in FIG. 4B, the refracted ray bends 90° from the perpendicular, or along the interface. As shown in FIG. 4C at angles of incidence greater than the critical angle, substantially no light passes from the first medium or fiber 55 through the surrounding medium 56, substantially all of the light being reflected back into the fiber 55.

In accordance with principles of physical optics, light is actually transmitted down a fiber waveguide in a number of different modes each of which has a characteristic distribution of the light energy. Dielectric waveguide theory states that for light introduced into a fiber both the number of light transmission modes supported and the depth of penetration of an evanescent boundary wave in the medium surrounding the fiber are determined by the following fiber characteristic term:

$$R = \frac{\pi d}{\lambda}(n_1^2 - n_2^2)^{1/2}$$

where $d$ is the fiber diameter, $n_1$ and $n_2$ are respectively the refractive indices of the fiber core and the surrounding medium, and $\lambda$ is the wavelength of light. Thus, the fraction of the total energy that is carried by the evanescent boundary wave depends upon the physical characteristics of the fiber and the modes which are excited in the fiber. As the angle at which the plane waves constituting a mode approaches the critical angle, the greater fraction of the total energy of the mode is propagated outside the fiber core. In the limit, when the mode angle equals the critical angle, substantially all of the energy is guided outside the core, and for angles less than the critical angle, the energy escapes the fiber and will be dissipated in the surrounding regions.

When there is a finite distance between a pair of fibers, there will always be a certain amount of coupling of the energy at the boundary of one fiber into the other fiber. However, no substantial amount of coupling takes place unless the fibers are very close together such as, for example, about a wavelength or less apart. Under such circumstances when there is weak coupling light will be coupled back and forth between waveguides as described with reference to FIG. 2 above. And in those cases where the phase velocity is changed the beat length is also changed. If the angle of the plane wave constituting a mode is close to but always greater than the critical angle, a reasonable change in the ratio of the indices of refraction of the fiber material and the surrounding medium drastically changes the energy in the evanescent wave. If the index of refraction of the surrounding medium is caused to approach that of the fiber, the energy in the evanescent wave is increased and the mode pattern will spread. Under these conditions for a short length of waveguide a drastic change in the amount of light coupled to the adjacent fiber can operate as a change from a condition of substantially no coupling to a condition of substantial coupling.

Figure 5A:
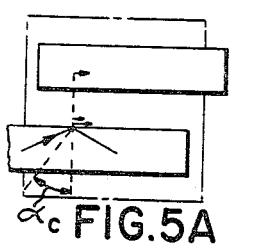
Figure 5B:
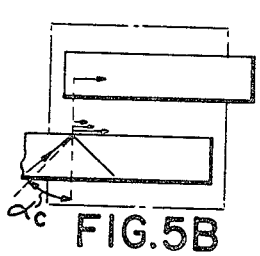
Figure 5C:
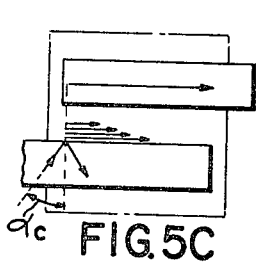
Figure 5D:
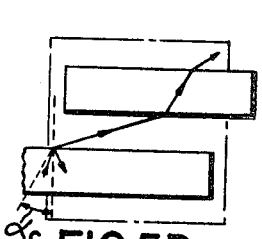

The transmission of light waves in the evanescent boundary in accordance with the dielectric waveguide theory of physical optics is illustrated in FIGS. 5A, B, C and D. As shown in FIGS. 5A–C when the angle of the plane wave constituting a mode is greater than the critical angle and approaches the critical angle $\alpha_c$ the amount of energy in the evanescent wave denoted by the arrows at the interface increases. As shown in FIG. 5D, for mode angles less than the critical angle, light energy escapes the fiber. Since variations in the light frequency, the fiber diameter, and the indices of refraction determine the number of modes and depth of penetration of the evanescent boundary wave into the surrounding medium, variation of these parameters in the desired manner can be utilized to vary the coupling effect between fibers in order to produce optical logic circuits.

As pointed out above with reference to FIG. 3, one way of changing the coupling characteristics from a condition of little coupling to a condition of strong coupling between two optical waveguides embedded in a surrounding medium is the application of a signal which changes the ratio of the indices of refraction of the fiber material and the surrounding medium. This change may also be accomplished by changing either an electric field or an electromagnetic in the region of the adjacent fibers. This may be accomplished by the introduction of an electric, electrostatic or electromagnetic field or by a change in the bias between the members which establish the respective fields. Additionally, by changing the spacing between the components, or the geometry of the components themselves, such as by the application of physical forces to the medium and/or fibers, the coupling between the fibers may be changed to provide an optical element for use in optical logic circuits of the types described in greater detail below.

While for convenience the light coupling shown in the drawing for all the gates described below conforms more closely to the illustration of FIG. 3 than to that of FIG. 2, it is intended that either type of coupling and the appropriate structures and control signals can be used in each instance.

Referring now to FIG. 6, there is shown the AND gate 25 in FIG. 1 in which light input in fiber 60 results in appreciable light output from a similar optical fiber 61 only in the presence of input signals from signal sources 62 and 63 such as, for example, magnetic field generators. The input fiber 60 is housed in close proximity to an intermediate optical fiber 64 and the two are surrounded by a medium 66 which has a normal refractive index lower than that of the fibers 60 and 64. The fiber 64 extends into a second medium 65 and is there positioned in close proximity to the output fiber 61. The medium 66 can be of a material the same as or similar to that of medium 65.

As indicated schematically in the drawing, when light is transmitted down the train 20 into the fiber 60 and signals from both the sources 62 and 63 are present, light in fiber 60 is coupled into fiber 64 and thence into fiber 61 for utilization further on down the train 20.

Referring now to FIG. 7, there is illustrated an AND gate similar to that of FIG. 6 but including a laser amplifying section 68 for the fiber 64'. At least in the amplifying section 68 the fiber 64' is doped with active material such as, for example, neodymium and irradiated with pumping light from a flash tube 69, such as a xenon flash tube, so that light amplification takes place during operation of the AND gate. By utilizing the fiber doped with active material the fiber serves not only as the waveguide for the light signal but also as the host for the material which produces amplification by stimulated emission radiation. Instead of having individual amplifying sections each with its own flash tube along the length of the computer train, preferably all the fibers at a particular stage in each of the computer trains are passed through a single amplifying section thereby requiring only a single flash lamp at each stage. And if gain is required in any train between stages, the fiber waveguide for that train section can be passed through an adjacent amplifying section.

A particular advantage of a four level laser such as one utilizing neodymium is that the laser does not absorb its own radiation. If the laser in the embodiments just described absorbed its own radiation it could effectively destroy the signal.

Referring now to FIG. 8, there is shown the OR gate 33 which includes two input fibers 81 and 82, the ends of which lie in surrounding media 83 and 84 respectively. Positioned within these media 83 and 84 adjacent the fibers 81 and 82 are the input ends of optical fibers 85 and 86, respectively. Again, the characteristics of the fibers and surrounding media are selected so that, under certain conditions, there is no appreciable amount of light coupled from either of the input fibers 81 and 82 to the respective output fibers 85 and 86. However, upon introduction of an input signal into either of the media 83 or 84 from energy sources 87 and 88, respectively, the coupling characteristics are changed so that light is coupled out of fibers 85 and 86 and an output signal is produced. Thus, an output light signal is produced when a coupling signal is applied to the gate 33 from either of the sources 87 and 88. Since two light input fibers 81 and 82 are required for this OR gate an optical gate in accordance with the present invention such as a gate similar to that shown in FIG. 2 can be used but with a length such that substantially half of the light from the first fiber is coupled into the second fiber to give an even distribution of light in the two fibers.

Referring now to FIG. 9, there is shown the switch gate 34 which includes in the train 21 a lasing fiber 91 such as, for example, neodymium doped barium crown glass, which is provided with a pumping light source 92 such as, for example, a xenon flash tube adjacent thereto. A pair of fiber waveguides 93 and 94 are positioned adjacent the lasing fiber 91 in separate surrounding media 95 and 96, respectively, spaced along the length of the lasing fiber 91. Under certain conditions there is substantially no coupling of light from the lasing fiber 91 out of the medium in the fiber 93. However, when a signal from a source 97, such as one of the types described above, is applied to the medium 95, a substantial amount of light is coupled into the fiber 93 and on to converter 35 for utilization as described with respect to FIG. 1 above, it being understood that the logic circuit shown in FIG. 1 is primarily illustrative of the use of gates according to the present invention and not a circuit having a particular intended use. Similarly, only when a signal is applied to the medium 96 from the source 98 is laser light coupled from the fiber 91 out of the medium in the fiber 94 from which it is transmitted to the converter 36.

Referring now to FIG. 10 there is shown a NOR gate 101 which includes a fiber waveguide 102 in a logic train. The fiber waveguide 102 passes through two separate media 103 and 104 in each of which is positioned adjacent thereto a decoupling fiber waveguide 105 and 106 respectively. If the length of the portions of the fibers 105 and 106 in close proximity with the fiber 102 is properly selected, upon the application of a signal from either of sources 107 and 108 which are connected to media 103 and 104, respectively, light which in the absence of these signals reaches the output end of the waveguide 102 is effectively coupled out of the waveguide 102 as light output in either of the waveguides 105 or 106 so that there is substantially no output from the end of waveguide 102. Thus the signal in the train is cut off by signals from either of the sources 107 or 108.

Referring now to FIG. 11 there is shown a feedback circuit utilizing features of the present invention wherein a lasing fiber 111 is provided with a pumping light source 112 which is adjacent thereto and which pumps the active portions of the fiber 111 in a medium 113 to excited states but is void of light at the emission frequency. Light at the emission frequency is provided in a fiber waveguide 114 adjacent the waveguide 111 in the medium 113 which under certain conditions prevents coupling of this light to the lasing fiber. At another position along the length of the laser fiber 111 one end of a fiber waveguide 115 is positioned adjacent the lasing fiber 111 within a medium 116, the other end of the fiber 115 being directed into the input end of the lasing fiber 111 for feeding light that is coupled into the fiber 115 back into the end of the lasing fiber 111. When a signal pulse from a source 119 is directed into the medium 133 to change the coupling characteristics between fibers 114 and 111 for light at the emission frequency, stimulated emission radiation takes place in the fiber 111 to produce an output light signal. Until a signal from the source 118 is introduced into medium 116 substantially none of the laser light will be coupled into the fiber 115 so that as soon as the pulse of stimulated emission is complete the laser output will cease. However, upon application of a signal from the source 118 during application of pumping light to fiber 111 by the light 112 laser light will be coupled from the lasing fiber 111 into the feed back fiber waveguide 115 to reproduce stimulated emission radiation in the fiber.

OR gates can also be constructed using a lasing fiber which will amplify the coupled light for operation of subsequent gates. For example, if a pump source 112 containing light at the emission frequency pumps the portion of the lasing fiber 111 within medium to just below threshhold, stimulated emission can be achieved if sufficient additional pumping light is applied to the fiber 111 from the fiber 114 when a signal from the source 119 is applied to the medium 113. The coupling in this case can be by either of the mechanisms illustrated in FIGS. 1 or 2 but the coupling must be arranged such that in the absence of the signal 119 there is not sufficient light coupled from fiber 114 into fiber 111 to produce stimulated emission. The other section of this OR gate includes the pump source 112' and fiber source 114' which is positioned adjacent the fiber 111 in the medium 116 and which is coupled to the fiber 111 in the presence of a signal from source 118. Laser action will take place in the lasing fiber 111 when signals from either source 117 or 118 are present.

Under certain operating conditions advantage can be made of lasing fibers which lase at more than one frequency. For example, a structure similar to that shown in FIG. 9 can be utilized in which the lasing fiber 91 lases at more than one frequency and the output fibers 93 and 94 are each coupled to one of these frequencies during the application of a signal from the respective signal source 97 or 98.

By way of illustrative example of the present invention a switching element, such as shown in FIG. 2, can be constructed utilizing the following parameters. One micron diameter optical fibers made of neodymium doped barium crown glass having an index of refraction of 1.525 are embedded side by side in a surrounding barium crown glass having an index of refraction of 1.518. The fibers run parallel to one another 1 micron apart for a distance of approximately one centimeter and transmit 10,600 A. light (the emission frequency of neodymium) in the $HE_{11}$ mode. Light introduced into one fiber does not emit from the other fiber, but upon application of a magnetic field strong enough to produce a change in the index of refraction on the order of $.5 \times 10^{-4}$ the beat length of light coupled between the fibers is changed so that light emits from the end of the other fiber.

Although the invention has been described in some detail by way of illustration and example for purposes of clarity of understanding, it is understood that changes and modifications may be practiced within the spirit of the invention as limited only by the scope of the appended claims.

What is claimed is:

1. A device for forming optical computer type logic comprising: a first waveguide adapted to carry light of a predetermined frequency; a second waveguide adapted to carry light of said predetermined frequency and transmit said light to an output end, said second waveguide mounted adjacent to said first waveguide at such a position as to receive and transmit light from one of said waveguides to said output end only when one of said waveguides is modified; a light-transmitting medium having a lower refractive index than any of said waveguides disposed between and in intimate contact with said first and second waveguides; means for modifying at least one of said waveguides to vary the index of refraction thereof at least one of said waveguides including active material which when portions of said active material are elevated to an excited state and exposed to light of said frequency will produce light amplification by stimulated radiation; and means for elevating said active material to said excited state whereby the quantity of light transferred to said second waveguide from said first waveguide will be controlled by varying the index of refraction of said at least one modified waveguide and amplified by elevating said at least one waveguide including active material to said excited state.

2. A device in accordance with claim 1 wherein said second waveguide includes said active material.

3. A device in accordance with claim 1 wherein said first waveguide is modified by varying the index of refraction of said wave guide.

4. A device in accordance with claim 3 wherein the means for modifying the index of refraction of said first waveguide comprises a source of electromagnetic wave energy.

5. A device in accordance with claim 3 wherein said means for modifying the index of refraction of said first waveguide comprises a source of electrical energy.

6. A device in accordance with claim 3 wherein said means for modifying the index of refraction of said first waveguide comprises a source of magnetic energy.

7. A device in accordance with claim 3 wherein said means for modifying the index of refraction of said first waveguide comprises a source of elastic energy.

References Cited

UNITED STATES PATENTS 3,208,342   9/1965   Nethercot _____ 350—96 X

OTHER REFERENCES

Snitzer: "Some Properties of Fiber Optics and Lasers (Part A)."

Optical Processing of Information, published by Spartan Books Inc., Baltimore, 1963, pp. 61–73.

JOHN K. CORBIN, *Primary Examiner.*